US012508192B2

(12) United States Patent
Zhang

(10) Patent No.: US 12,508,192 B2
(45) Date of Patent: Dec. 30, 2025

(54) DEVICE AND METHOD FOR DRY EYE TREATMENT

(71) Applicant: Aizhong Zhang, Rochester, NY (US)

(72) Inventor: Aizhong Zhang, Rochester, NY (US)

( * ) Notice: Subject to any disclaimer, the term of this patent is extended or adjusted under 35 U.S.C. 154(b) by 719 days.

(21) Appl. No.: 17/402,539

(22) Filed: Aug. 14, 2021

(65) Prior Publication Data

US 2022/0047449 A1 Feb. 17, 2022

Related U.S. Application Data

(60) Provisional application No. 63/066,312, filed on Aug. 16, 2020.

(51) Int. Cl.

*A61H 15/02* (2006.01)
*A61H 7/00* (2006.01)
*A61H 15/00* (2006.01)

(52) U.S. Cl.

CPC ............. *A61H 15/02* (2013.01); *A61H 7/004* (2013.01); *A61H 15/0078* (2013.01);
(Continued)

(58) Field of Classification Search

CPC .... A61H 15/02; A61H 7/004; A61H 15/0078; A61H 2015/0014; A61H 2015/0071; A61H 2201/0119; A61H 2201/0207; A61H 2201/0228; A61H 2201/0285; A61H 2201/1207; A61H 2201/1463; A61H 2201/1604; A61H 2201/165;
(Continued)

(56) References Cited

U.S. PATENT DOCUMENTS 4,554,911 A 11/1985 Nielsen
5,690,608 A * 11/1997 Watanabe .......... A61H 23/0245 601/19

(Continued)

FOREIGN PATENT DOCUMENTS

CN 109394497 A * 3/2019 ......... A61H 15/0078
CN 110381900 A * 10/2019 ......... A61B 17/0231

OTHER PUBLICATIONS

Borchman, Douglas. "The optimum temperature for the heat therapy for meibomian gland dysfunction." The ocular surface 17, No. 2 (2019) 360-4.

*Primary Examiner* — Justine R Yu
*Assistant Examiner* — Matthew R Moon
(74) *Attorney, Agent, or Firm* — Lynne M. Blank, Esq.

(57) ABSTRACT

A dry eye treatment device, having a roller, a holder, wherein the roller contacts and rolls over an eyelid in a plurality of directions in a treatment; a heating element to generate heat, wherein at least a portion of the heat is transferred to the roller; a temperature monitoring system, which has a thermal sensor and a temperature control circuit; and an electric power source. The roller is of a convex cylindrical or concave cylindrical shape. A method for dry eye treatment, of cleaning an eyelid with a first cleansing wipe; heating a roller to a predetermined temperature; applying thermally conductive gel between the roller and the eyelid; rolling the roller over the eyelid in a plurality of directions; and removing the thermally conductive gel and expressed debris with a second cleansing wipe; and further, increasing the temperature by an increment and repeating the treatment method.

20 Claims, 13 Drawing Sheets

(52) U.S. Cl.
CPC ................ *A61H 2015/0014* (2013.01); *A61H 2015/0071* (2013.01); *A61H 2201/0119* (2013.01); *A61H 2201/0207* (2013.01); *A61H 2201/0228* (2013.01); *A61H 2201/0285* (2013.01); *A61H 2201/1207* (2013.01); *A61H 2201/1463* (2013.01); *A61H 2201/1604* (2013.01); *A61H 2201/165* (2013.01); *A61H 2201/1692* (2013.01); *A61H 2201/5007* (2013.01); *A61H 2201/5082* (2013.01); *A61H 2205/024* (2013.01)

(58) Field of Classification Search
CPC .... A61H 2201/1692; A61H 2201/5007; A61H 2201/5082; A61H 2205/024; A61H 2201/0221; A61H 2201/1654; A61H 2203/0456; A61H 2201/1659; A61H 2203/0431; A61B 90/50; A61B 2090/502; A61F 2007/0004; A61F 2007/0071; A61F 2007/0072; A61F 2007/0076; A61F 2007/0087
See application file for complete search history.

(56) References Cited

U.S. PATENT DOCUMENTS

| | | | | |
|---|---|---|---|---|
| 6,908,195 | B2 | 6/2005 | Fuller | |
| 7,069,084 | B2 | 6/2006 | Yee | |
| 7,122,013 | B2 | 10/2006 | Liu | |
| 7,976,573 | B2 | 7/2011 | Korb et al. | |
| 8,187,311 | B2 | 5/2012 | Korb et al. | |
| 8,449,928 | B2 | 5/2013 | Gilbard et al. | |
| 8,491,508 | B2 | 7/2013 | Smith et al. | |
| 8,506,539 | B2 | 8/2013 | Guillon et al. | |
| 8,617,229 | B2 | 12/2013 | Korb et al. | |
| 9,039,718 | B2 | 5/2015 | Rynerson | |
| 9,216,028 | B2 * | 12/2015 | Korb | A61F 9/00772 |
| 9,675,516 | B2 | 6/2017 | Parsloe | |
| 10,130,507 | B2 | 11/2018 | Whitehurst et al. | |
| 2006/0100558 | A1 * | 5/2006 | Smith | A61H 15/02 601/128 |
| 2007/0060988 | A1 * | 3/2007 | Grenon | A61F 9/00772 607/96 |
| 2012/0165708 | A1 * | 6/2012 | Parsloe | A61H 15/00 601/18 |
| 2012/0179074 | A1 * | 7/2012 | Ikebe | A61F 7/007 601/19 |
| 2016/0317379 | A1 * | 11/2016 | Mosaddegh | A61F 7/007 |
| 2017/0119618 | A1 * | 5/2017 | Jurna | A61H 15/0092 |
| 2017/0266077 | A1 * | 9/2017 | Mackin | A61G 13/1235 |
| 2019/0142689 | A1 * | 5/2019 | Marty | A61H 15/0092 601/112 |
| 2019/0343702 | A1 * | 11/2019 | Smith | A61M 21/02 |
| 2019/0365597 | A1 * | 12/2019 | Hill | B25J 11/008 |
| 2020/0138662 | A1 * | 5/2020 | Powell | A61H 1/00 |
| 2020/0261304 | A1 * | 8/2020 | Rizik | A61H 15/0092 |
| 2022/0161441 | A1 * | 5/2022 | Harashima | B25J 19/028 |

* cited by examiner

DEVICE AND METHOD FOR DRY EYE TREATMENT

CROSS REFERENCE TO RELATED APPLICATIONS

Priority is claimed to Provisional U.S. Patent Application Ser. No. 63/066,312 by A Zhang filed Aug. 16, 2020 and entitled "DEVICE AND METHOD OF DRY EYE TREATMENT", the disclosure of which is incorporated herein by reference.

FIELD OF THE INVENTION

This invention relates to the field of treatment for dry eye syndrome, in particular, it relates to the device and method for the treatment of meibomian gland dysfunction.

BACKGROUND OF THE INVENTION

Tear film is a thin, moist and protective film anterior to the cornea, and it's essential to ocular surface health and visual acuity. Chronic impairment in tear film will lead to dry eye syndrome, formally termed keratoconjunctivitis sicca. Dry eye is one of the most common reasons people visit an eye care professional. Patients with dry eye syndrome either cannot secrete enough tears or the tear quality is not good enough.

Tear film is composed of three layers anterior to the corneal epithelial cells, and its thickness is reported to be around 3 μm. The posterior mucous layer contains mucins secreted by the goblet cells mostly in the conjunctiva. The mucous layer stabilizes the tear film on the conical epithelium. The middle aqueous layer is the thickest part of the tear film, and it is secreted from the lacrimal glands. The aqueous layer is essential for spreading of the tear film, carrying nutrients and oxygen to the cornea, defending the ocular surface with immunological and antimicrobial proteins, and regulating tear osmolarity. The lipid layer is the most anterior of the tear film, and its thickness is usually in the order of 1 to 100 nm. It is secreted by the meibomian glands. The lipid layer can provide a smooth optical surface for the cornea, reduce evaporation and enhance the tear film stability.

Any chronic impairment in the each of these three layers or in the interactions among these three layers could lead to dry eye syndrome. Clinically, meibomian gland dysfunction (MGD) is the most common type of dry eye.

Meibomian glands are named after a 17th century German physician Heinrich Meibom, who gave the first detailed descriptions of these glands. They are modified sebaceous glands vertically lined up inside the tarsal plates of both upper and lower eyelids, and there are about 30-40 of meibomian glands in the upper eyelid and about 20-30 in the lower eyelids. There are numerous acini project from the main duct of each meibomian gland. Meibomian gland secretions are produced when the membranes of the innermost acini cells rupture, and lipid droplets and cell debris are released into the ducts. Meibomian glands are holocrine glands in nature, similar to other sebaceous glands. The normal lipids secretion of the meibomian glands, termed meibum, is mainly an oily mixture of wax esters and sterol esters, and some small amount of fatty acids, fatty alcohols, and sterols, etc.

MGD patients usually have impaired meibomian glands, where the openings of the glands are partially or completely obstructed by solidified and thickened lipids and/or other debris at the eye lid margins. Over time the impairment could progress to meibomian gland atrophy. The direct causes of clogging of the meibomian gland orifices are hyperkeratinization of the ductal cells and the degeneration of the acini cells. The further underlying causes include aging, hormonal changes, blepharitis, prolonged computer or cellphone use, long-term contact lens wear, etc. Normal meibum is clear, but the meibum secretion from MGD might be turbid, inspissated, and milky in color. The insufficient supply of lipids onto the ocular surface could lead to higher evaporation of the underneath aqueous layer, which could further lead to tear break up and the exposure of the underlying corneal epithelial cells. This will cause the sensation of dryness, itchiness or even burning feelings of the eye.

In the prior art, a number of methods attempting to treat or relieve the MGD have been described. The most common way is to use eye drops or artificial tears to lubricate the ocular surface. In these artificial tears, pharmaceutical expertise to balance critical parameters such as pH, surface tension, etc., are necessary to closely imitate the natural human tears. However, the instillation of artificial tears focuses on relieving the ocular dryness symptoms instead of recovering the meibomian gland functionalities, and its effective time tend to be less than one hour.

The use of steroids, androgen, cyclosporine, or lifitegrast, etc., are sometimes employed clinically to treat more severe dry eye, where artificial tears alone could not relieve the symptoms. Yet again, these medicines tend to treat the signs and symptoms, instead of recovering meibomian gland functions.

Several eyelid cleansers to clean the eyelid margins and maintain eyelid hygiene have been disclosed, including the one described in U.S. Pat. No. 8,449,928.

Warm compresses of various kinds have been developed to warm up the eyelids and soften, melt or substantially decrease the viscosity of the inspissated lipids and debris at the meibomian glands orifices. The warm compresses could be as simple as a conventional hot cloth. Sometimes, follow-up massaging with fingers after the use of warm compresses is recommended by the doctors. However, several drawbacks associated with the warm compresses include: potential contamination by unsterilized compresses; potential overheating to cause discomfort or burning; insufficient heat to melt the occlusions clogged at the meibomian glands orifices, etc.

U.S. Pat. No. 8,506,539 by Guillon et al. describes an eyelid margin wipe with temperature control in the range of 40° C. to about 55° C. for at least 5 minutes, and the heat is generated by activating one or more chemical agents. However, non-specific heating on the eyelid has a potential of adversely affecting the delicate eye region. Also, heating temperature over 50° C. poses a risk of eyelid burning or discomfort for at least some patients.

U.S. Pat. No. 6,908,195 describes a therapeutic eye and eye lid cover, which includes a pair of goggles covering the eyes, and heat a liquid reservoir to saturate the air enclosed around the eyes with water vapor to prevent evaporation from the eyes. However, this cover could only manipulate the local ocular environment, when it's worn. Once the cover is taken off, its effect for preventing evaporation is gone.

U.S. Pat. No. 9,039,718 describes a method to use an electromechanical device to move a swab cyclically around the eyelid margin to purportedly impact and remove the debris at the eyelid margin to treat ocular disorders such as dry eye syndrome, blepharitis, and meibomitis. However, the swab is effective only at the eyelid margin, and it couldn't impact other parts of the eyelid.

U.S. Pat. No. 7,122,013 describes an eyes massage device, which consists of a pair of goggles, a pneumatic-powered cylinder assembly to generate air pressure above or below the atmospheric pressure alternately to massage the eyes. However, a complicated pneumatic-powered cylinder assembly may not be very easy to use.

U.S. Pat. No. 9,675,516 describes a device for melting and expressing material from blocked glands of mammalian eyelid, which comprises a massaging bobbin that is substantially concave cylindrical in shape, and has a plurality of continuous narrow ridges extending around the massaging bobbin in a generally helical configuration, and when in use, the massaging bobbin transmits heat to the mammalian eyelid and rotates so that the massaging elements move in a direction parallel to a lash line across the mammalian eyelid. However, the movement direction is limited to be parallel to a lash line, which might limit the secretion of some meibomian glands, especially the acini and ductules that are not close to the lash line.

Another type of MGD treatment devices include an eyelid warmer that applies heat to the inner eyelids, and an eye cup that compresses the eye lid with pulses, such as described in U.S. Pat. Nos. 7,976,573, 8,187,311, 8,617,229, etc. However, elements directly contacting the ocular surface, or the inner eyelids increase system complexity and cost, and potentially may increase contamination and inflammation risks.

Also, U.S. Pat. Application 2016/0317379 describes a meibomian gland roller comprises a cylinder with a heating element to express meibomian glands. However, the cylinder may limit the area on an eyelid that can be conveniently reached in a treatment due to the physiological structure of the eye and neighboring facial structures.

U.S. Pat. No. 8,491,508 describes a device for stimulating the meibomian glands of the eyelid comprising a handle and a head, and the head comprises an eyepiece that oscillates to provide a massaging action to an eyelid. However, the fixed eyepiece limits the eyelid coverage. Similarly, U.S. Pat. No. 10,130,507 describes an eye treatment device, comprising a heating element; a thermal transfer rod; and two outer eyelid contact pieces. However, since the eyelid contact piece is fixed, the covered area is limited.

SUMMARY OF THE INVENTION

It is an object of this invention to provide a dry eye treatment device that can heat and massage the eyelids so that thickened or inspissated lipids and debris that obstruct the meibomian glands ducts and orifices can melt and be cleaned way, and the flow pathways of the secreted lipids from the meibomian glands are cleared and the expression of the lipids is ameliorated.

It is another object of this invention to provide a dry eye treatment device that could be self-administrated by the patient and simplify the treatment process of meibomian gland dysfunction. Self-administration would greatly improve the treatment convenience and increase the treatment frequency and patient compliance and may significantly reduce the financial burden of dry eye patients.

It is another object of this invention to provide a heated roller of convex cylindrical shape so that the roller could be rolled from many different directions on the eyelid to provide improved massaging of the meibomian glands with a larger area coverage and better pressing from various directions.

It is further another object of this invention to provide some embodiments of the dry eye treatment device which separate the heating element (the heat generator) from the roller (the heat applicator), so that the roller internal structure could be simplified, and its size could be significantly reduced. Further, the smaller roller could reach corners previously difficult to reach on the eyelid to cover a larger area of an eyelid during a treatment.

It is yet another object of this invention to provide an embodiment of a head-mounted dry eye treatment device, which the patient may wear comfortably in a sitting or lying position, while a heated roller or a heated plate provides heating and massaging to the eyelids.

It is yet another object of this invention to provide an embodiment of a robotic arm to directly heat and massage the eyelids with a roller, a spinning or vibrating pinhead, or a heated plate as the end effector of the robotic arm. The robotic arm and the associated computer system could be trained with machine learning with a large quantity of images and videos of real-life dry eye treatment by medical professionals, so that the device could be self-administrated by the subject, yet still could provide professional dry eye treatment.

It is still another object of this invention to provide heating and massaging of the eyelids, which may have therapeutic and cosmetic benefits, such as reducing subcutaneous adipose tissues around the lower eyelids.

The present invention relates to a dry eye treatment device, comprising: a roller, wherein the roller is connected to a holder, wherein the roller contacts and rolls over an eyelid in a plurality of directions in a treatment; a heating element to generate heat, wherein the heating element is outside the roller, wherein at least a portion of the heat is transferred from the heating element to the roller by a heat transfer element with thermal conduction; a temperature monitoring system, wherein the temperature monitoring system comprises a thermal sensor and a temperature control circuit; and an electric power source to electrically heat the heating element. The roller is of a convex cylindrical shape or a concave cylindrical shape. The thermal sensor measures a temperature of a surface of the roller, or a temperature of an element thermally connected with a surface of the roller, wherein the temperature control circuit ensures the temperature of the surface of the roller is within a predetermined temperature range, wherein the predetermined temperature range is a temperature range within 40 to 60° C. The roller could comprise a thermally conductive coating layer, and the coating layer could be conformable. The roller could be motorized, wherein the speed of rotation of the roller is adjustable. The device further comprising a thermally conductive gel to be applied between the roller and the eyelid in the treatment. In some embodiments, the dry eye treatment device is a head-worn device, wherein the head-worn device comprises a case and a strap to fixate on a head of a subject, wherein the roller is motorized and heated, and the roller and holder are located inside an eye chamber of the head-worn device. In some other embodiments, the roller and the holder are connected to a robotic arm, wherein the roller is an end effector of the robotic arm, wherein a computer controls the motion of the robotic arm. The end effector of the robotic arm is replaced with a member selected from the group consisting of a spinning pinhead, a vibrating pinhead, a heating plate and an intense pulsed light source. The robotic arm and the computer are trained with machine learning.

The present invention also relates to a dry eye treatment device, comprising: a roller, wherein the roller is connected to a holder, wherein the roller contacts and rolls over an eyelid in a plurality of directions in a treatment; a heating element to generate heat, wherein the heating element is inside the roller, wherein at least a portion of the heat is transferred from the heating element to the roller; a temperature monitoring system, wherein the temperature monitoring system is outside the roller, wherein the temperature monitoring system comprises a thermal sensor and a temperature control circuit; and an electric power source to electrically heat the heating element. The heating element is a resistance heating element or a heat lamp inside the roller, or it could be a roller surface of the roller heated by eddy currents of induction heating.

The invention further includes a method for dry eye treatment, comprising: cleaning an eyelid with a first cleansing wipe; heating a roller to a predetermined temperature; applying thermally conductive gel between the roller and the eyelid; rolling the roller over an eyelid in a plurality of directions; and removing the thermally conductive gel and expressed debris with a second cleansing wipe. The roller is of a convex cylindrical shape or a concave cylindrical shape. Further, the dry eye treatment method comprises increasing the predetermined temperature by an increment, and repeating the method for dry eye treatment.

BRIEF DESCRIPTION OF THE DRAWINGS

FIG. 1(*a*) presents a device with a concave cylindrical roller. FIG. 1(*b*) presents a device with a convex cylindrical roller. FIG. 1(*c*) presents the side view of a device with a bent neck.

FIG. 2(*a*) is a convex cylindrical roller with a smooth roller surface. FIG. 2(*b*) is a convex cylindrical roller with protrusions forming a herringbone-like pattern with longitudinal ribs. FIG. 2(*c*) is a convex cylindrical roller with spirally arranged ridges. FIG. 2(*d*) is a convex cylindrical roller with circular protrusions. FIG. 2(*e*) is a concave cylindrical roller with a smooth roller surface. FIG. 2(*f*) is a concave cylindrical roller with herringbone-like protrusions and longitudinal ribs. FIG. 2(*g*) is a concave cylindrical roller with spirally arranged ridges. FIG. 2(*h*) is a concave cylindrical roller with circular protrusions.

FIG. 3(*a*) presents an embodiment with a resistance heating element inside the roller. FIG. 3(*b*) presents an embodiment with a heat lamp inside the roller.

FIG. 9(*a*) presents a head-worn device, which comprises a case and a strap. FIG. 9(*b*) presents a head-worn device, which further comprise an overhead strap. FIG. 9(*c*) presents an embodiment of a head-worn device, which comprises an electrical power cord.

FIG. 10(*a*) present a view from the eyes of a subject toward the head-worn device. FIG. 10(*b*) illustrates a simplified exploded view of the head-worn dry eye treatment device, from the anterior of the device to the posterior of the device closer to an eye of a subject.

FIG. 13(*a*) presents one embodiment with a spinning pinhead as the end effector. FIG. 13(*b*) presents another embodiment with a vibrating pinhead as the end effector. FIG. 13(*c*) presents one embodiment with a heating plate as the end effector.

DETAILED DESCRIPTION OF THE INVENTION

Figure 1A:
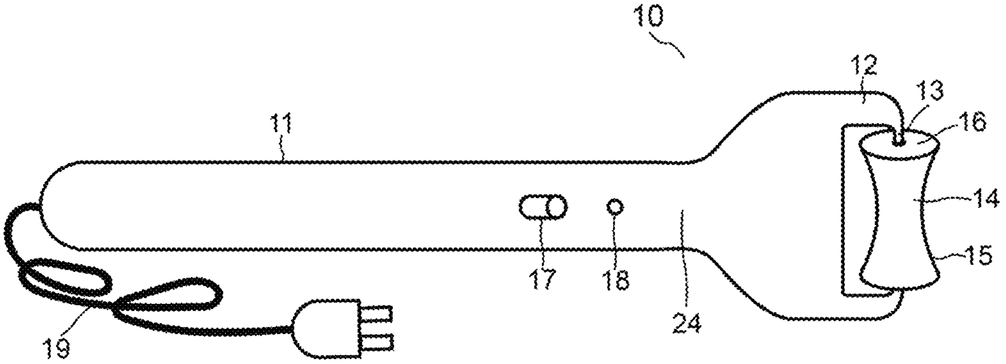
FIG. 1 presents possible embodiments of a dry eye treatment device.
Figure 1B:
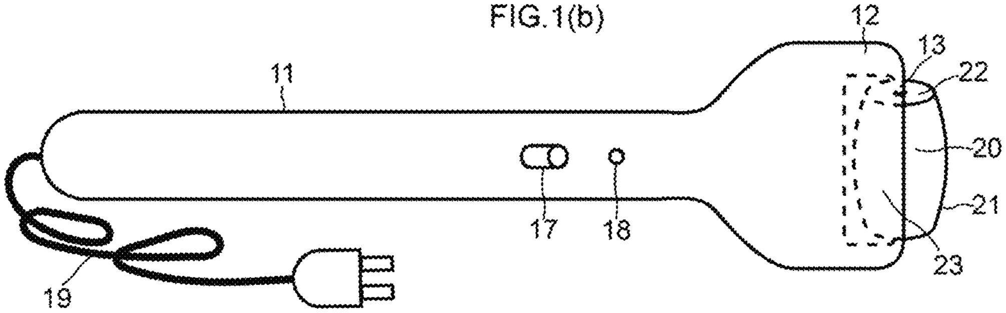
Figure 1C:
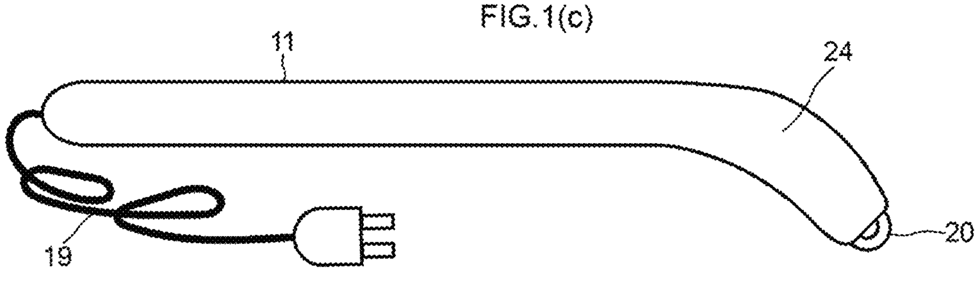

FIG. 1 presents possible embodiments of a dry eye treatment device. FIG. 1(*a*) presents an embodiment of the dry eye treatment device 10, which comprises a handle 11 and a roller 14. The roller 14 has a side surface 15, and two end surfaces 16. The side surface 15 is the surface used to contact the skin of an eyelid in a treatment and is hereinafter referred to as the roller surface. The roller 14 comprises a shaft 13, which is connected to a holder 12. There is a switch 17 on the handle to turn on and off the device for heating control, and a light indicator 18 is used for indicating the heated roller 14 is ready for treatment. The light indicator 18 could use different colors to differentiate different states, for example, a green light indicates that it's ready to use, while a red light indicates that the roller is still warming up. Alternatively, the light indicator 18 could only have one color and it stays stable when ready to use and it's flickering during warming up of the roller. Further, an electrical power cord 19 is to be connected with an electrical outlet to provide electric power source. However, in some other embodiments, a battery set could be used which could be placed in the handle 11. The roller 14 in FIG. 1(*a*) is of a concave cylindrical shape, and preferably, the radius of curvature of the concave contour is chosen to match the convex contour of a human eye with closed eyelids.

FIG. 1(*b*) presents another embodiment of the dry eye treatment device, where the roller 20 is of a convex cylindrical shape, i.e., a barrel shape. The roller 20 has a roller surface (side surface) 21 and two end surfaces 22. In FIG. 1(*b*), only part of the roller 20 is directly exposed. A roller housing 23 is used to shelter about half of the roller, indicated by dashed lines in FIG. 1(*b*). Preferably, the roller housing is made of materials with low thermal conductivity, such as ceramics, and more preferably, the interior of the roller housing is coated with high reflectivity coating materials such that the heat radiation onto the roller housing is redirected toward the roller in order to reduce heat dissipation into the ambient environment.

This convex cylindrical shape in FIG. 1(*b*) will ensure a flexible use of the heated roller in various directions on the eyelid surface, including but not limited to the direction along the eyelid margin and the direction perpendicular to the eyelid margin. By rolling the heated roller in a plurality of directions on the eyelids, improved pressing and massaging of the eyelids and the meibomian glands embedded inside the eyelids could be achieved with a large eyelid area coverage.

Compared with a cylindrically shaped roller, the advantage of a concave or convex cylindrically shaped roller is the flexibility to adapt to the shape of an eye, and reach a larger eyelid area in treatment, since the physiological structures of the nose, the frontal bone and the zygomatic bone form relatively complex contours that may obstruct the use of a cylindrically shaped roller, but may be reached with a concave or convex cylindrically shaped roller of an appropriately chosen size. Preferably, the roller is made of metal. In some embodiments, a thin thermally conductive coating layer could be added to the roller surface. If added, the coating layer is the interface contacting the skin, hence the coating layer material should have dermatologically proven skin compatibility. Preferably, the coating layer could be made of conformable elastomeric materials or materials easy to clean and sterilize for repeated use, including but not limited to silicone rubber, methacrylate polymers, fluoroelastomer, or polytetrafluoroethylene. A conformable coating layer may enhance the contour match between the roller surface and the eyelid and improve the heat transfer. In some embodiments, this coating layer could be porous. Since the roller 14 or 20 is used to contact the eyelid to warm and melt inspissated lipids, preferably, the total length of the roller 14 or 20 between the two end surfaces is about 2 mm to 20 mm Along the shaft direction, the roller diameter varies. Preferably, taking the maximum and minimum roller cross-section diameter into account, the diameter of the roller is within the range of 1 mm to 20 mm, so that the roller could directly heat all or at least a majority part of the eyelids.

As shown in FIG. 1(*c*), in some embodiments, the neck 24 of the dry eye treatment device is bent so that the head of the device, including the holder 12 and the roller 20 are approximately at an angle of about 30° to 60° with respect to the handle 11. The bent neck might enable an easy grip of the handle to apply the roller more conveniently toward the eyelids during a treatment, especially for self-administrated treatment by a patient.

The roller could have a smooth surface formed by bare metal or a metal substrate with a coating layer, or it could have ribs or ridges protruding from the roller surface, and preferably they form a repeated geometrical pattern. The protrusions on the roller surface could be formed directly by the metal or it could be formed by the coating layer materials. When a heated roller is applied to an eyelid, the protrusions on the roller surface will press into the eyelid surface in action, increase the contact area with the eyelid skin, and provide enhanced massaging to facilitate the expression of the meibum and the clearance of the of inspissated or solidified lipids and debris at the ducts and orifices of the meibomian glands. Additionally, the massaging effect by the protrusions on the roller surface could help cutaneous microcirculation.

Figure 2:
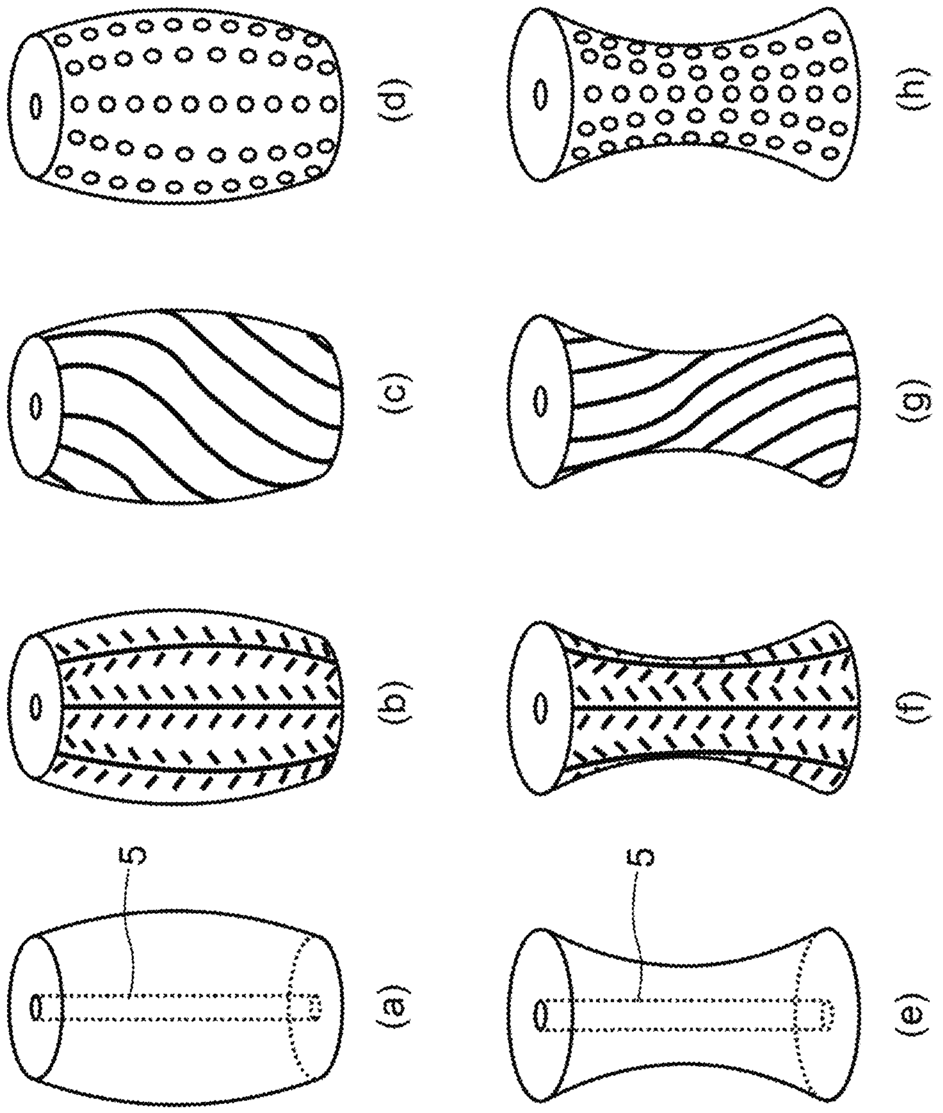
FIG. 2 presents some possible embodiments of the roller.

FIG. 2 presents some possible embodiments of the roller. FIG. 2(*a-d*) are four embodiments of a convex cylindrical roller, and FIG. 2(*e-h*) are four embodiments of a concave cylindrical roller. FIG. 2(*a*) is a convex cylindrical roller with a smooth roller surface. FIG. 2(*b*) is a convex cylindrical roller with protrusions forming a herringbone-like or repeated V-shaped pattern with longitudinal ribs. FIG. 2(*c*) is a convex cylindrical roller with spirally arranged ridges. FIG. 2(*d*) is a convex cylindrical roller with circular protrusions. FIG. 2(*e*) is a concave cylindrical roller with a smooth roller surface. FIG. 2(*f*) is a concave cylindrical roller with herringbone-like protrusions and longitudinal ribs. FIG. 2(*g*) is a concave cylindrical roller with spirally arranged ridges. FIG. 2(*h*) is a concave cylindrical roller with circular protrusions.

Figure 3A:
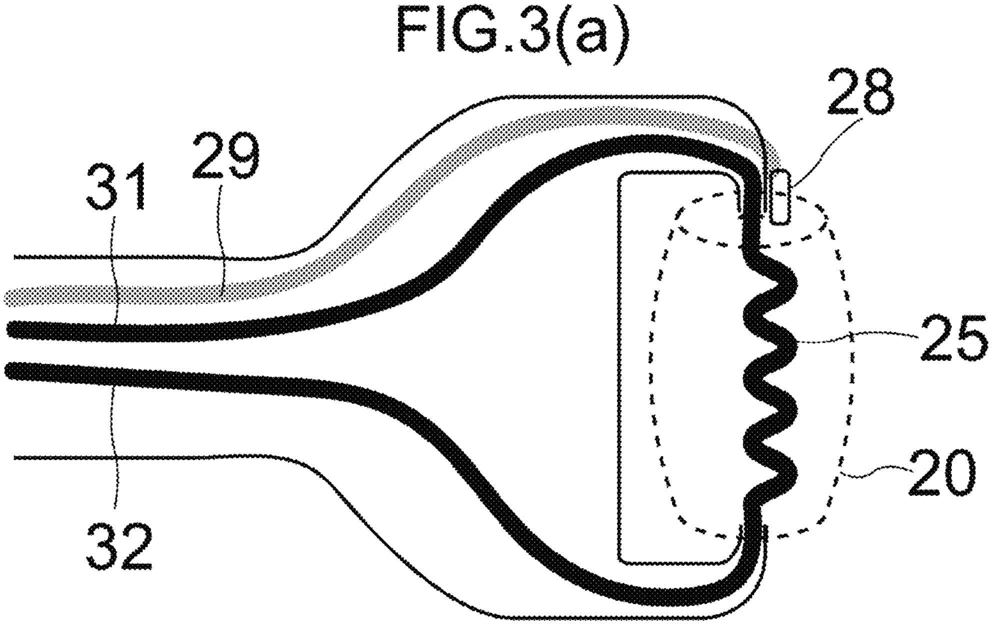
FIG. 3 presents two embodiments of the dry eye treatment device with a heating element inside the roller.
Figure 3B:
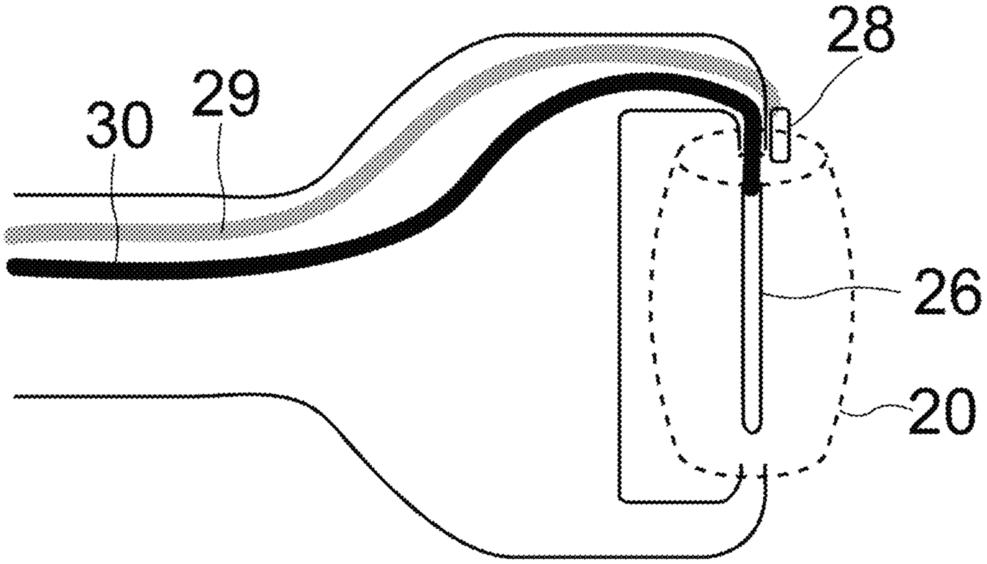

FIG. 3 presents two embodiments of the dry eye treatment device with a heating element inside the roller. In one embodiment as shown in FIG. 3(*a*), a heating element 25, which is a resistance heating element, is placed inside the roller 20. At its two ends, the wires 31 and 32 are used to provide electricity through the heating element, and the wires are further connected to a power cord or a battery set. Preferably, the resistance heating element 25 comprises nichrome coils. With an electric current through the resistance heating element 25, it warms up with ohmic heating, and the heat is radiated to the roller surface 21. In some embodiments, some thermally conductive and electrically insulating materials such as silicone rubber may be used to fill the space between the heating element and the roller surface, and the roller surface is heated by thermal conduction.

A temperature monitoring system could be used to monitor and control the heating process in real time. The temperature monitoring system comprises a thermal sensor 28 and a temperature control circuit (not shown). The thermal sensor 28 is in contact with a roller end surface or it is in close proximity to the roller end surface, with a distance preferably smaller than 1 mm. The thermal sensor 28 is connected to the electric power source and the rest of the temperature monitoring system via a wiring structure 29. The thermal sensor could be a thermal couple or a thermistor, and it monitors the real-time temperature of the roller surface. The temperature control circuit compares the real-time temperature of the roller surface with a predetermined temperature range and adjusts the electric current of the heating element, in order to maintain the roller surface temperature within a predetermined temperature range, which is usually within 40 to 60° C., such as 40 to 45° C. If the thermal sensor 28 is not in direct contact with the roller end surface but it is in close proximity to the roller end surface, a calibrated temperature of the roller surface based on the sensor real-time temperature measurement could be used. More preferably, the operator of the device could adjust the desired temperature range, so that it's customized to the need of a specific subject with guidance from a medical professional. In FIG. 3, the temperature monitoring system is outside the roller, although in some other embodiments, the thermal sensor 28 could be embedded inside the roller.

FIG. 3(*b*) presents anther embodiment of the roller, where a heat lamp 26 is used as the heating element inside the roller 20, instead of the resistance heating element 25, and the heat lamp 26 is connected with a wiring structure 30 to supply electric power. The embodiment of the heat lamp could be continuous or pulsed light sources, such as a laser or a broadband light source, further a light diffusing structure could be included to distribute the radiation relatively evenly on the roller surface.

Further, in some other embodiments, a thin silicone rubber heating sheet is applied to the roller surface, and the heating element is not inside the roller, but directly on the roller surface.

Furthermore, in some other embodiments, an induction heating unit embedded inside the holder could be used to generate eddy currents in the roller surface. Preferably, in these embodiments, a thermally conductive and electrically insulating coating layer is added to insulate the eyelid skin from the eddy currents. In these embodiments, the heating element is the roller surface heated by eddy currents of induction heating.

This invention further provides a dry eye treatment device, where the heat generator (i.e., the heating element) and the heat applicator (i.e., the roller) are separated, and the heating element is outside the roller. Between the heating element and the roller, a heat transfer element with high thermal conductivity is used to transfer heat. One of the main advantages of the separation of the heat generator from the heat applicator is that the heat applicator, i.e., the roller, could be made much smaller since no complicated internal structure is necessary. With a reduced size, the heated roller could be employed more flexibly so that the small roller could reach corners previously difficult to reach on the eyelid to cover a large area of an eyelid under treatment. Further, usually the heat generator requires an electric current, and if part of the heat transfer element is thermally conductive and electrically insulating, no electric current is involved in the roller part. This could help the operator avoid electric shocks, which will increase the safety of use with the instrument.

Figure 4:
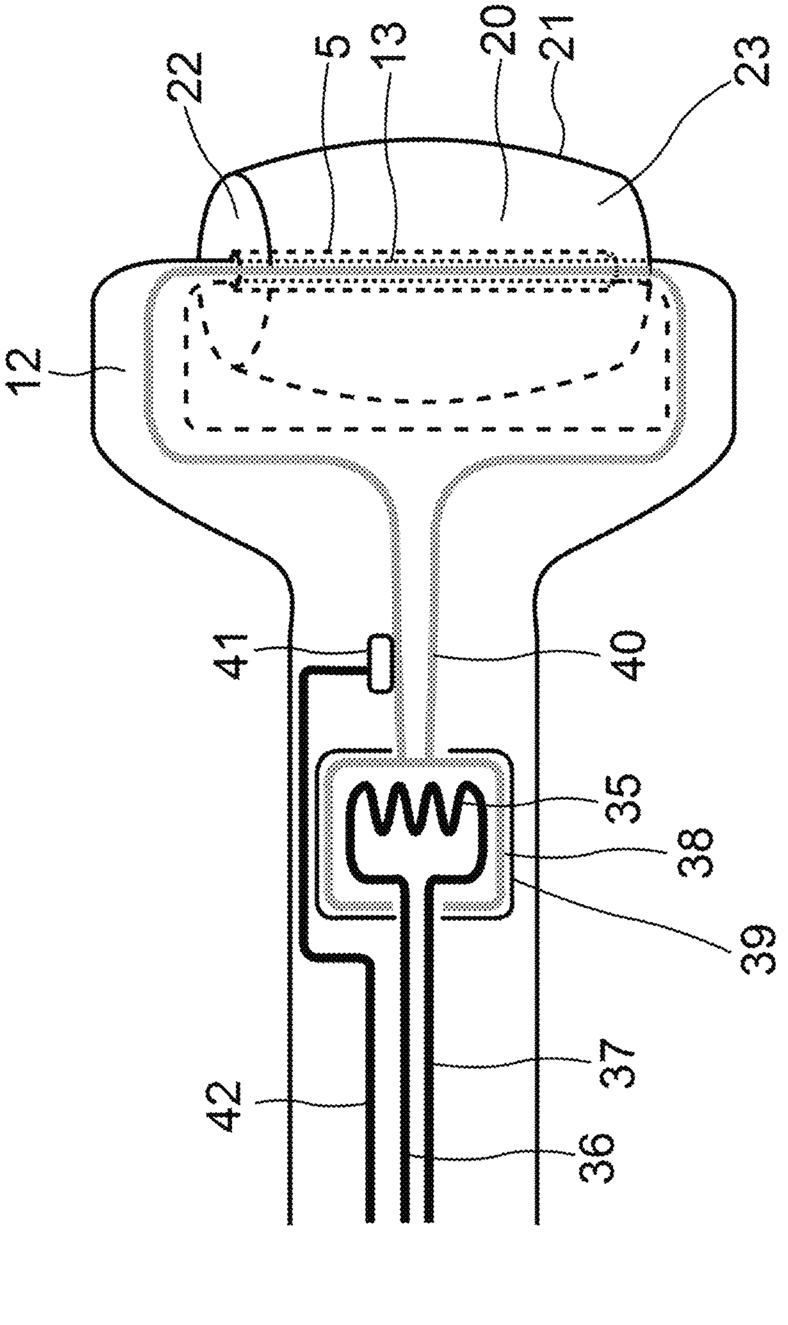
FIG. 4 presents an embodiment of the dry eye treatment device with separate heat generator and heat applicator, where the heat generator is a resistance heating element.

FIG. 4 presents an embodiment of the dry eye treatment device with separate heat generator and heat applicator, where the heat generator is a resistance heating element 35, preferably made of nichrome coils. The heating element in this embodiment is the resistance heating element 35, and it's outside the roller 20. The resistance heating element 35 is connected with wires 36 and 37 to provide electric power. A first housing 38 of the resistance heating element 35 is preferably made of thermally conductive materials, such as metal, to collect and transfer the generated heat. A second housing 39 of the resistance heating element is exterior but adjacent to the first housing 38. Preferably, the second housing 39 is made of thermally insulating materials, such as ceramics. A heat transfer element 40 is used to transfer heat from the heating element to the roller. Preferably, the heat transfer element 40 is a heat conducting element, which could be a metal wire or a wire bundle of thick enough diameter for efficient heat transfer with thermal conduction. The heat transfer element could also be a heat pipe. In one preferred embodiment as shown in FIG. 4, the heat transfer element 40 passes through a central bore 5 of the shaft 13. In some other embodiment, the heat transfer element 40 could directly comprise the entire shaft, or it could be thermally connected to but structurally separate from the shaft. Preferably, the shaft 13 is journaled to the roller 20, and a thermally conductive lubricant could be sealed properly to facilitate heat transfer. A thermal sensor 41 is in direct contact with the heat transfer element 40 and it's connected with a wiring structure 42 to supply electric power and communicate with the rest of a temperature monitoring system to monitor and control the heating process in real time. Preferably, thermal insulation materials are used to fill the empty space in the handle and the holder.

Figure 5:
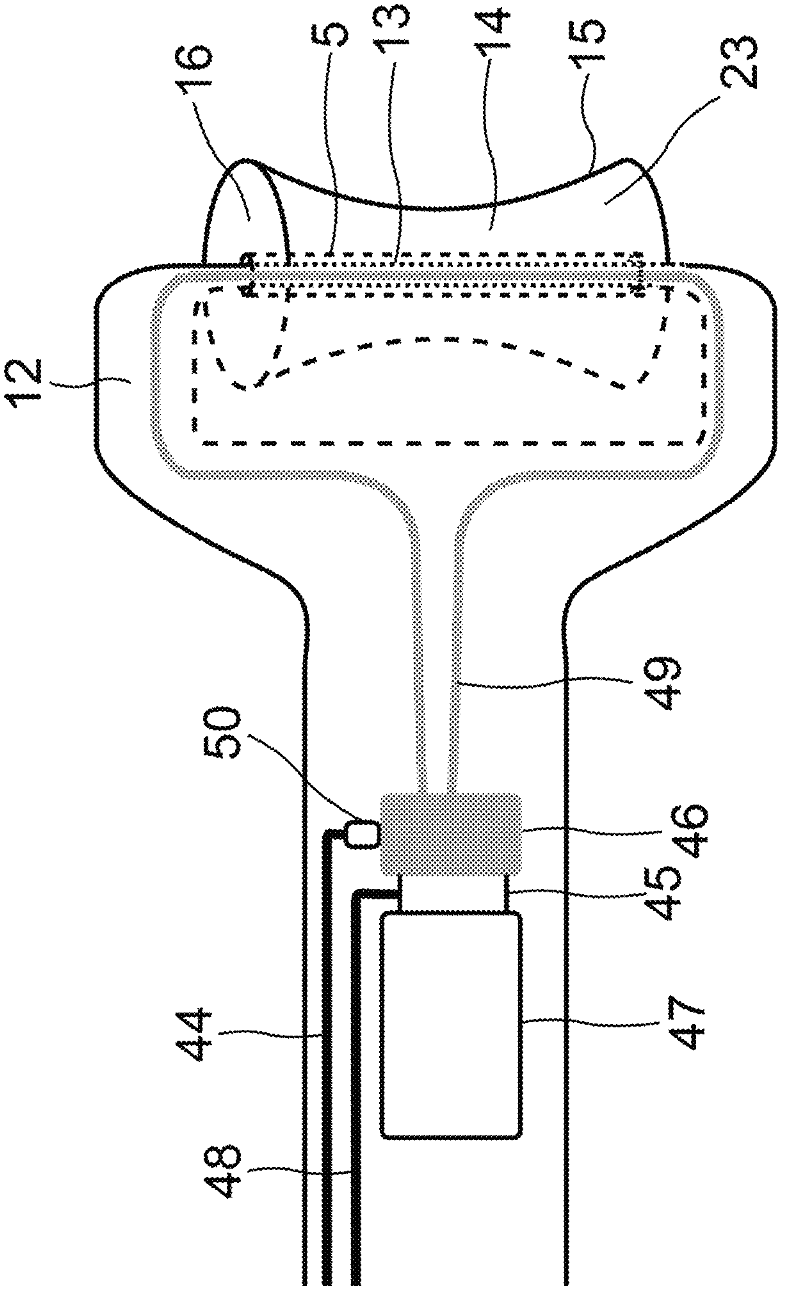
FIG. 5 presents another embodiment of the dry eye treatment device with separate heat generator and heat applicator, where a thermoelectric heating unit is used as the heat generator.

FIG. 5 presents another embodiment of the dry eye treatment device with separate heat generator and heat applicator, where a thermoelectric heating unit 45 is used as the heat generator. The heating element in this embodiment is the thermoelectric heating unit 45 outside the roller 14. The thermoelectric heating unit generates heat through the thermoelectric effect. The thermoelectric heating unit 45 is connected with a wiring structure 48 to provide power, and it is sandwiched between a hot block 46 and a cold block 47. Preferably, the connection between the thermoelectric heating unit 45 and the hot block 46 and the cold block 47 are thermally conductive and electrically insulating. Similar to FIG. 4, a heat transfer element 49 is used to transfer the heat from the heating element to the roller with thermal conduction. The heat transfer element 49 could be a heat conducting element, such as a metal wire or a wire bundle of thick enough diameter or it could be a heat pipe. A thermal sensor 50 is in direct contact with the hot block 46 and it's connected with a wiring structure 44 to supply electric power and communicate with the rest of a temperature monitoring system to monitor and control the heating process in real time. Preferably, thermal insulation materials are used to fill the empty space in the handle and the holder.

Figure 6:
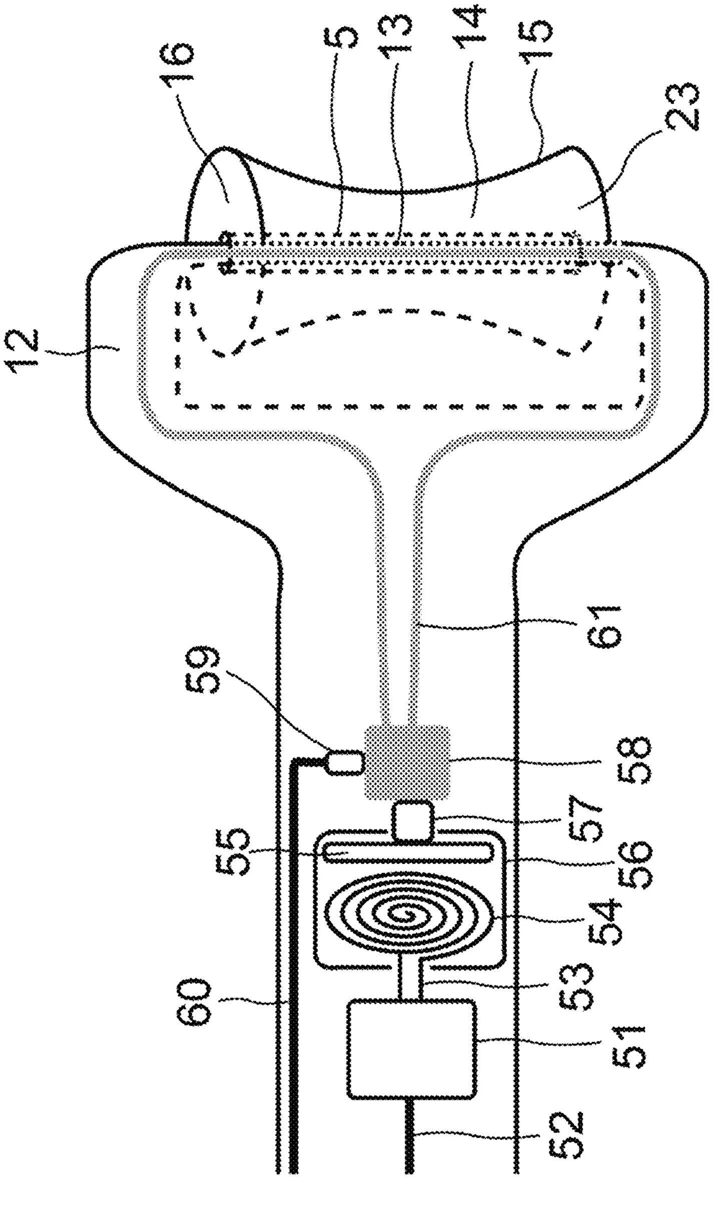
FIG. 6 provides another embodiment of the dry eye treatment device with separate heat generator and heat applicator, where an induction heating unit is used as the heat generator.

FIG. 6 presents another embodiment of the dry eye treatment device with separate heat generator and heat applicator, where an induction heating unit is used as the heat generator. The heating element in this embodiment is the induction heating unit outside the roller 14. The induction heating unit comprises power electronics 51, an inductor 54, and an induction target 55. The power electronics 51 of the induction heating unit is connected with a wiring structure 52, which supplies electricity to the induction heating unit. One embodiment of the power electronics 51 comprises an alternating current (AC) electrical input, an electromagnetic compatibility (EMC) filter, and AC-DC converter, a rectifier and filter, an inverter, and a feedback control circuit. Another wiring structure 53 connects the power electronics 51 and the inductor 54. One preferred embodiment of the inductor 54 is a spirally shaped metal coil. The electromagnetic variation in the inductor 54 generates eddy currents in the induction target 55, which is preferably a metal plate. The eddy currents cause heating of the induction target 55. If the induction target comprises ferromagnetic materials, magnetic hysteresis could also contribute to the heating of the induction target. Preferably, a housing 56 surrounds the inductor 54 and the induction target 55. Preferably, the housing 56 is made of thermally insulating materials, such as ceramics. A thermally conductive and electrically insulating element 57 directly contacts the induction target 55, and transfers heat to a heat block 58, and further transfers heat to a heat transfer element 61. The heat transfer element 61 is used to transfer heat from the heating element to the roller. Preferably, the heat transfer element 61 is a heat conducting element for thermal conduction, such as a metal wire or a wire bundle of thick enough diameter, or it could be a heat pipe for efficient heat transfer. In one preferred embodiment, the heat transfer element 61 passes through a central bore 5 of the shaft 13. In some other embodiments, the heat transfer element 61 could directly comprise the entire shaft, or it could be thermally connected to but structurally separate from the shaft. Preferably, the shaft 13 is journaled to the roller 14, and a thermally conductive lubricant could be sealed properly to facilitate heat transfer. A thermal sensor 59 is in direct contact with the heat block 58 and it's connected with a wiring structure 60 to supply electric power and communicate with the rest of a temperature monitoring system to monitor and control the heating process in real time. Preferably, thermal insulation materials are used to fill the empty space in the handle and the holder.

In FIG. 3 to FIG. 6, the heat generator (i.e., the heating element) and the heat applicator (i.e., the roller) are separate. Preferably, heat is first transferred to the shaft (preferably via thermal conduction) and then to the roller. Although heat transfer via convective airflow or radiation toward the roller surface are alternative options, the heat transfer efficiency tends to be lower.

Figure 7:
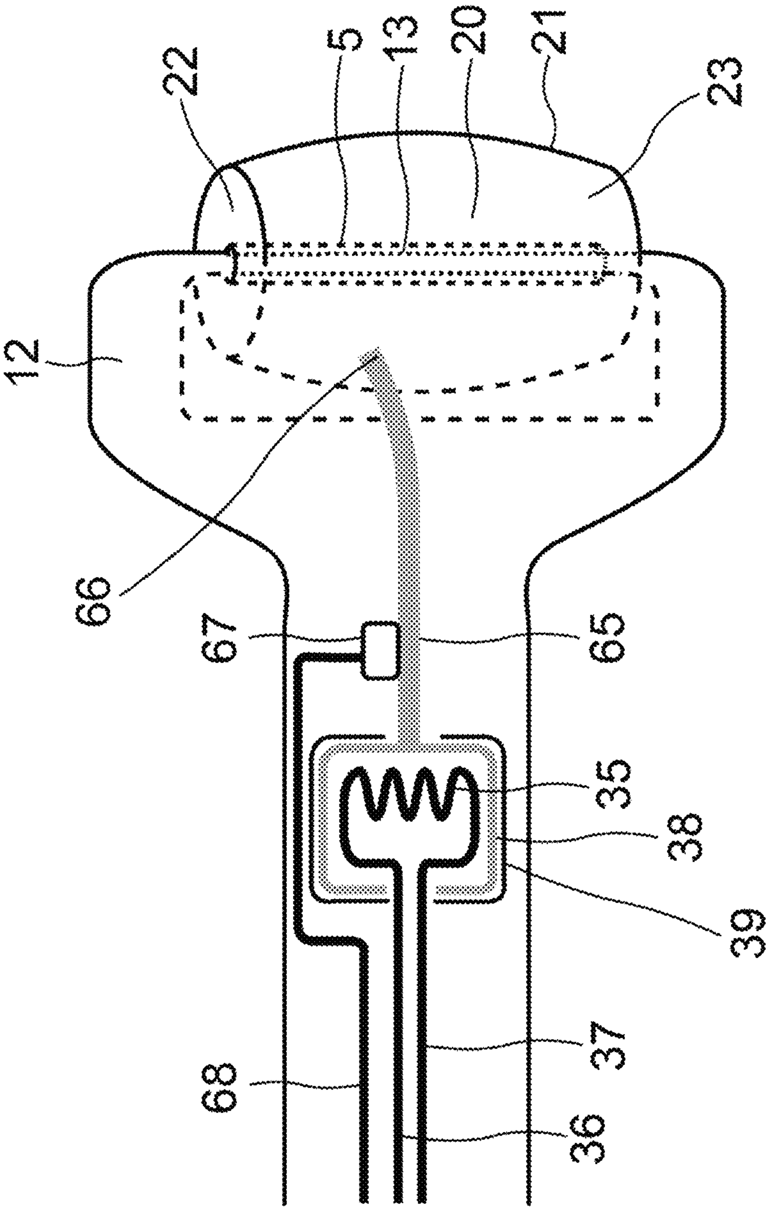
FIG. 7 presents an embodiment of the dry eye treatment device, where a contact element directly rubs the roller surface when the roller is rolling over an eyelid.

FIG. 7 presents an embodiment of the device for dry eye treatment, where a contact element directly rubs the roller surface when the roller is rolling over an eyelid in a treatment. Direct thermal conduction heat transfer to the roller surface is used in this embodiment. The heat generator unit, i.e., the resistance heating element 35, is similar to that in FIG. 4. A heat transfer element 65 is connected with the first housing 38 of the resistance heating element, and 65 is preferably a rod made of thermally conductive materials, such as metal, to collect and transfer the generated heat. At the end of the heat transfer element 65, a contact element 66 contacts the roller surface, hence heat is directly transferred from the first housing 38 directly to the roller 20, without transferring electricity. The contact element 66 could be a metal brush. The contact element 66 rubs the proximal side of the roller surface 21, when the roller is rotated. Preferably, both the contact element 66 and the proximal side of the roller surface 21 are located inside the roller housing 23 to prevent heat dissipation and improve heat transfer efficiency of the device. The distal side of the roller surface 21 is directly applied to the eyelids of a subject. A thermal sensor 67 directly contacts the heat transfer element 65 and a wiring structure 68 provides electricity and connects the heat transfer element 65 to the rest of a temperature monitoring system to monitor and control the heating process in real time. Preferably, thermal insulation materials are used to fill the empty space in the handle and the holder.

Note that in FIG. 7, a heat generator of the resistance heating element is used. However, other types of heat generators, such as those with thermoelectric heating unit or an induction heating unit could also be used.

In the above embodiments, plain bearing with thermally conductive lubricant is used at the journal and the roller. However, thermally conductive ball bearings could also be employed to enable rolling and efficient heat transfer to the roller.

Figure 8:
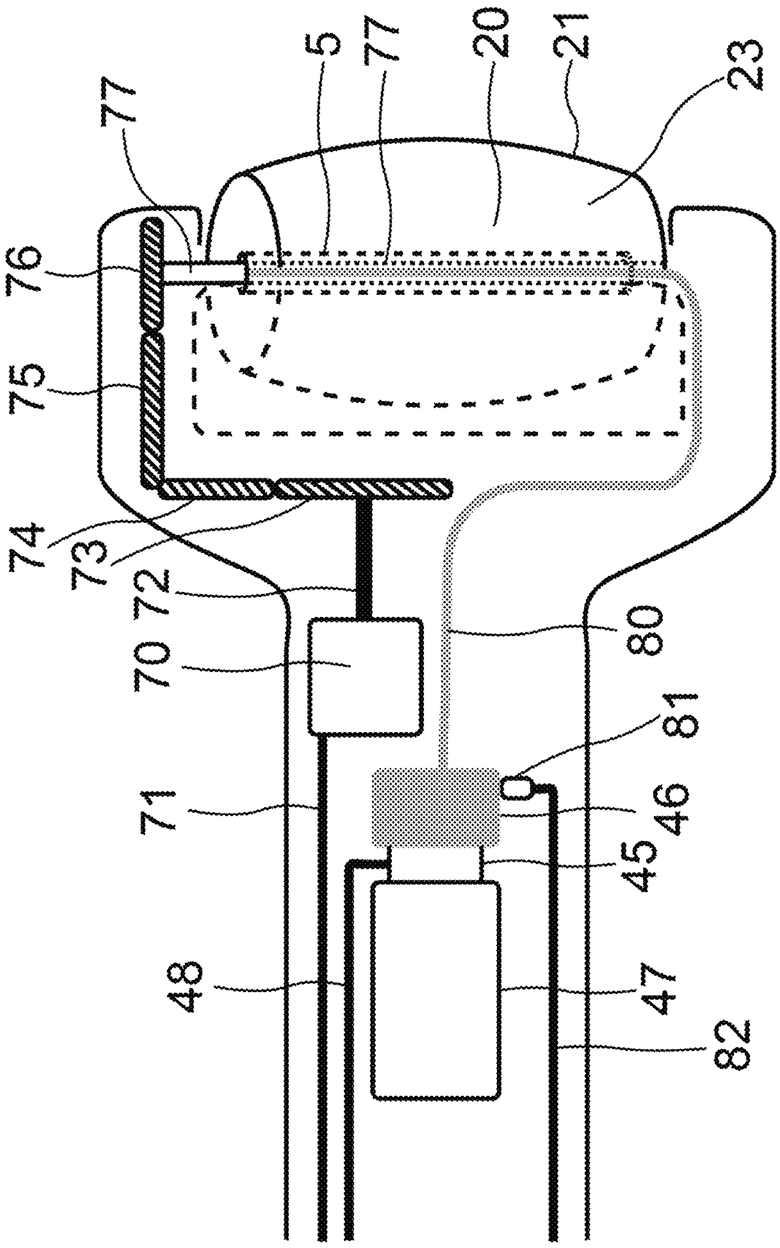
FIG. 8 presents an embodiment of the dry eye treatment device with a motorized roller.

Further, in the above embodiments, the roller is manually rolled on closed eyelids to provide both heating and massaging for dry eye treatment. However, a motorized roller could be employed in some embodiments, so that the roller automatically rotates. FIG. 8 presents an embodiment with a motorized roller. Similar to FIG. 5, a thermoelectric heating unit 45 is connected with a wiring structure 48 to provide power, and it is sandwiched between a hot block 46 and a cold block 47. The heating element in this embodiment is the thermoelectric heating unit 45 outside the roller 20. Preferably, the connection between the thermoelectric heating unit 45 and the hot block 46 and the cold block 47 are thermally conductive and electrically insulating. A heat transfer element 80 is used to transfer the heat from the heating element to the roller with thermal conduction. Specially shown in FIG. 8, the heat transfer element 80 is a heat conducting element, which passes through a central bore 5 of the shaft 77, although other heat transfer mechanisms between the heat transfer element and the shaft are also possible. When the roller is rotated by a motor, the shaft 77 rotates, but the heat transfer element 80 remains still. In some other embodiments, the heat transfer element contacts the roller shaft, and it rubs the shaft during rolling. A thermal sensor 81 is in direct contact with the hot block 46 and it's connected with a wiring structure 82 to supply electric power and communicate with the rest of a temperature monitoring system to monitor and control the heating process in real time. Preferably, thermal insulation materials are used to fill the empty space in the handle and the holder.

A motor 70 is connected with a wiring structure 71 to supply electric power. Preferably, there is a button (not shown) in the handle to activate the motor by an operator. The motor shaft 72 is rotated when the motor 70 is activated, and gears 73, 74, 75, and 76 form a gear group to transmit torque so that the shaft 77 of the roller 20 is driven to rotate. Preferably, the speed of rotation of the roller is adjustable by the user. In the embodiment shown in FIG. 8, the shaft 77 and the roller surface 21 are fixated so that they rotate together. This is different from some of the previously described embodiments where the roller shaft is still when the roller surface rotates.

Further, other than being operated by an eye care professional, the disclosed device and method of dry eye treatment could be used for self-administration. If a subject were to use the disclosed device by oneself, preferably a subject will look into a mirror or a camera with real-time display in a treatment, and the eye under treatment should be closed, while the other eye could open when necessary to ensure desired position and movement of the roller.

Figure 9C:
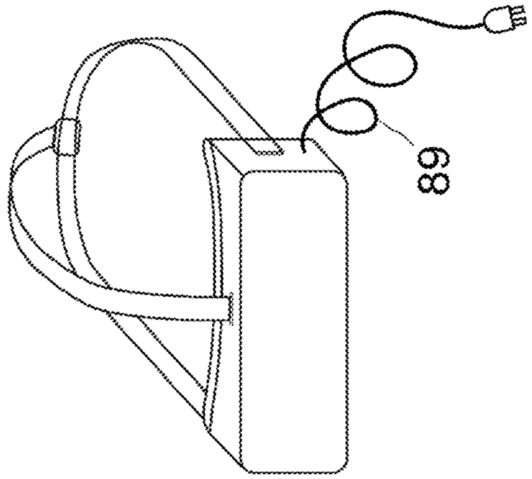
FIG. 9 presents three embodiments where a motorized and heated roller is embedded inside a head-worn dry eye treatment device.
Figure 9B:
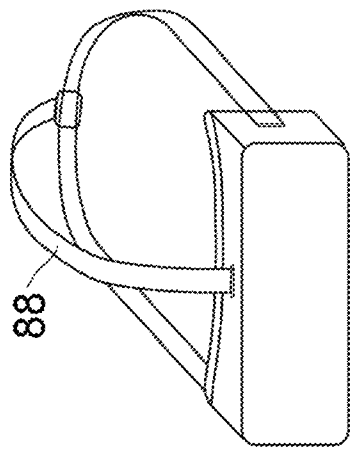
Figure 9A:
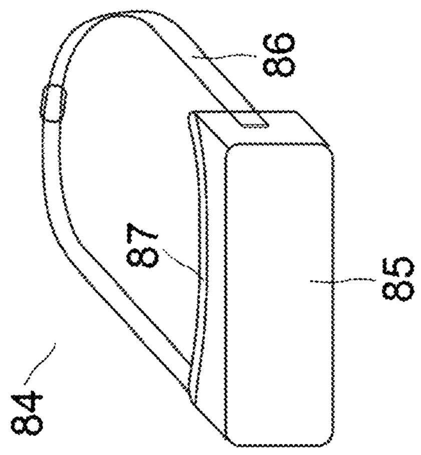

FIG. 9 presents three embodiments where a motorized roller is embedded inside a head-worn dry eye treatment device. The head-worn device 84 in FIG. 9(*a*) comprises a case 85 and a strap 86 to fixate on the head of a subject. The portion of the case 85 directly connecting to the head is a contacting band 87. The contacting band 87 is made of flexible materials, such as rubber, polyurethane foam or fabrics, to conform to the contours of the subject's head and nose. The contacting band 87 forms an enclosed space where the heat is not easily dissipated into the ambient environment. The head-worn device in FIG. 9(*b*) further comprises an overhead strap 88. The embodiments in FIG. 9(*a*)-9(*b*) contains a battery set (not shown) inside the case 85 to provide electric power. FIG. 9(*c*) presents another embodiment, which comprises an electrical power cord 89, to be connected with an electrical outlet to provide electric power. The head-worn device 84 could be worn when the subject is sitting or lying down in a supine position or lying on an inclined bed or seat for treatment comfort. The head-worn device could still be used when the subject is in a prone position; however, due to the gravity of the components of the head-worn device, a supine position or inclined face-up position is more preferred.

Figure 10A:
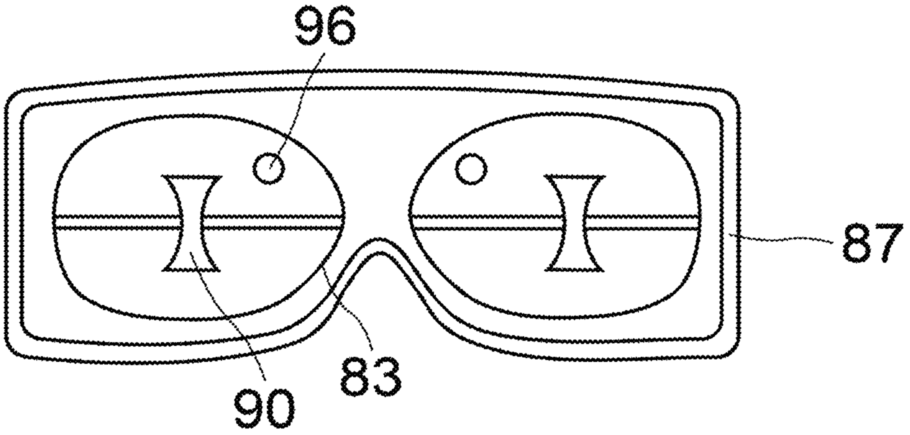
FIG. 10 presents detailed structure of one embodiment of the head-worn device for dry eye treatment.
Figure 10B:
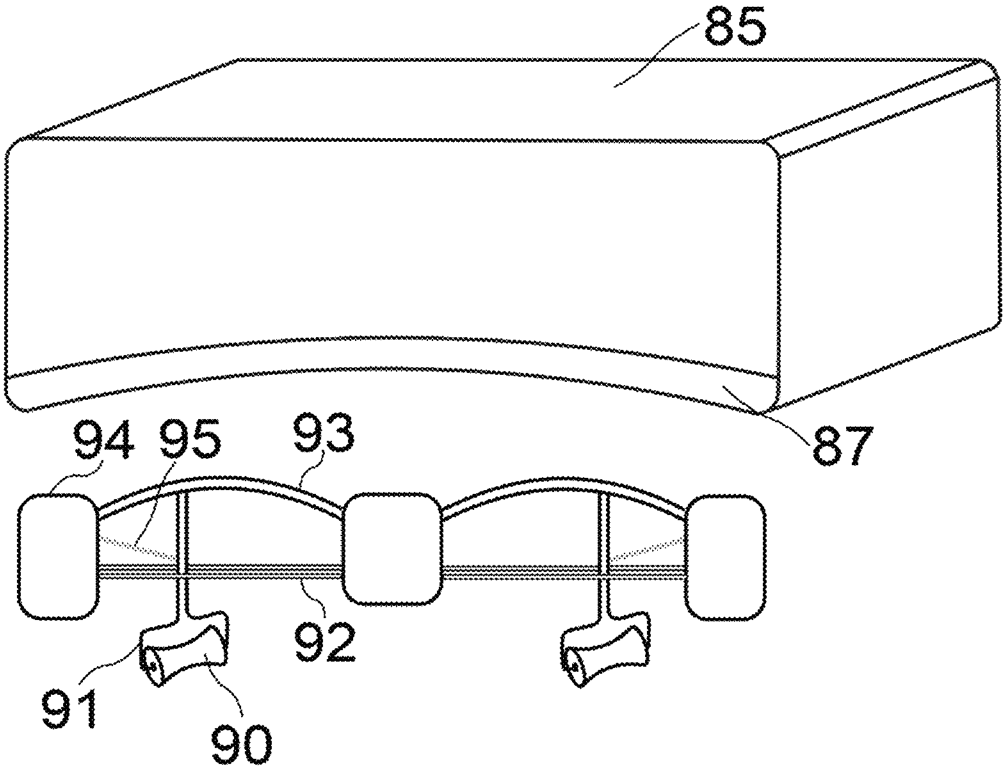

FIG. 10 presents detailed structure of one embodiment of the head-worn device for dry eye treatment. FIG. 10(*a*) presents a view from the eyes of a subject toward the head-worn device. A motorized, heated roller 90 is located inside an eye chamber 83 of the head-worn device. The eye chamber 83 will form an enclosed space with the eye and adjacent structures of the subject, when the subject uses this head-worn device with closed eyelids. The roller 90 will be in direct contact with the closed eyelid during the heating and massaging treatment. Preferably, a micro thermal camera 96 is embedded inside the eye chamber 83 to monitor the temperatures of the roller and the eyelid in real time, which comprises part of the temperature monitoring system. One embodiment of the micro thermal camera is the FLIR Lepton micro thermal camera (FLIR Systems, Wilsonville, Oreg.). FIG. 10(*b*) illustrates a simplified exploded view of the head-worn dry eye treatment device. The direction from the top to the bottom of FIG. 10(*b*) corresponds to the direction from the anterior of the device to the posterior of the device closer to an eye of a subject, where the roller is to be contacted with a closed eyelid. The components contained within the case 85 include the roller 90, a holder 91, a linear slide rail 92, a curved rail 93, a control and driver set 94, and an optional connecting rod 95. The curved rail 93 matches the curvature of the eye, specifically matches to the curvature of the eyelid margin, when the upper and lower eyelids are closed. This will ensure an approximately constant pressure when the roller 90 is moving on the closed eyelids. Preferably, a suspension system is included in the curved rail 93, and a feedback circuit of the pressure sensor is used to ensure precise pressure control during the roller massaging process. The control and driver set 94 could provide the heating and movement control of the roller 90. Preferably, the control and driver set 94 could provide a heating safety mechanism, so that when the temperature of the roller is above a certain threshold, the roller will be lifted up to detach from the eyelid to avoid overheating or burning of the eyelid. Preferably, in the head-worn dry eye treatment device, the heat generator (i.e., the heating element) and the heat applicator (i.e., the roller) are separated, and the heating element is outside the roller. Between the heating element and the roller, a heat transfer element with high thermal conductivity is used to transfer heat with thermal conduction. The optional connecting rod 95 could be used, if a rotary to reciprocating mechanism or a rotary to oscillating mechanism is employed, such as a slider-crank mechanism, or a crank-rocker mechanism, to name a few. Alternatively, a cam could be used to control the motion of the roller 90 on the eyelid.

Preferably, a thermally conductive gel is applied to the roller surface or applied to the eyelid by an automatic dispenser (not shown) embedded in the head-worn device before the roller starts to contact the eyelid. In some other embodiments, the thermally conductive gel could be applied onto the closed eyelids by the operator manually.

Figure 11A:
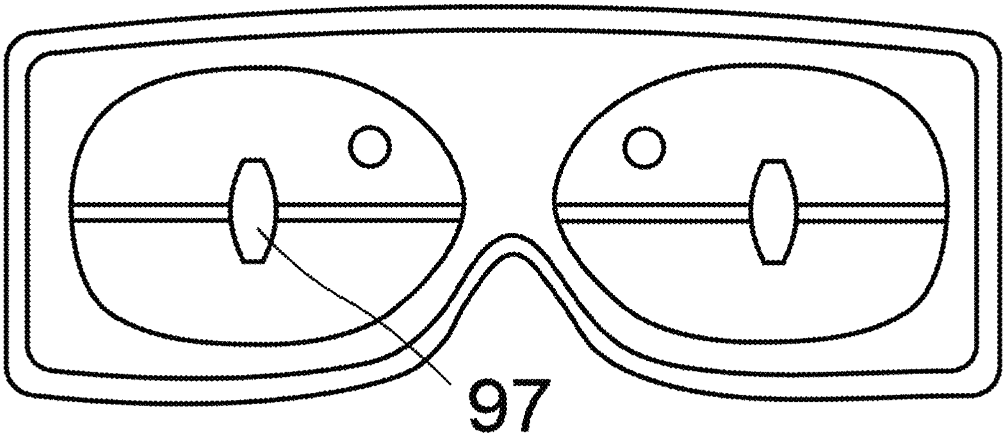
FIG. 11 presents two alternative embodiments of the head-worn device for dry eye treatment. The embodiment in FIG. 11(*a*) comprises a convex cylindrical roller. The embodiment in FIG. 11(*b*) comprises two heating plates.
Figure 11B:
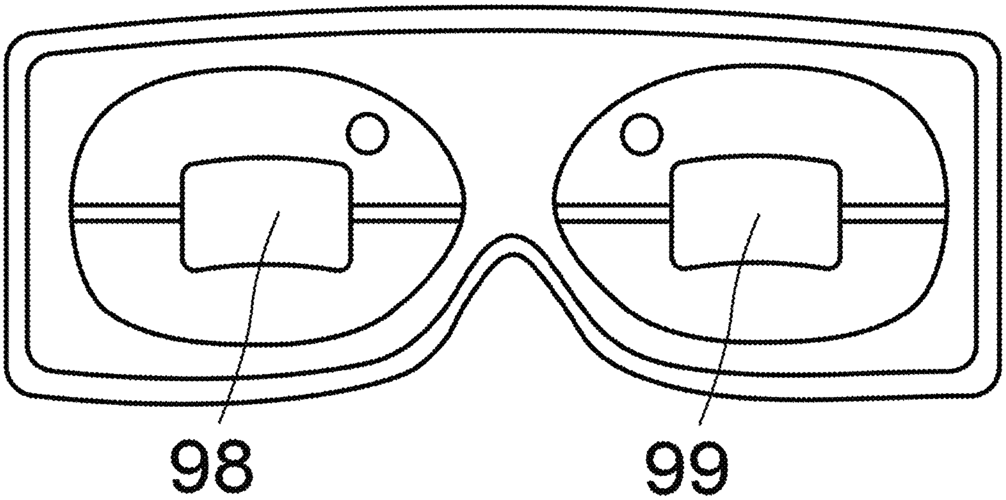

FIG. 11 presents two alternative embodiments of the head-worn device for dry eye treatment. The embodiment in FIG. 11(*a*) comprises a convex cylindrical roller 97. The embodiment in FIG. 11(*b*) comprises two heating plates 98 and 99. The heating plates 98 and 99 are of the shape of eye, conforming to the contour of the closed eyelids. The distance between 98 and 99 could be adjusted to match different interpupillary distance of different subject, and to reach different parts of the eye of the same subject. Reciprocating pressure could be applied to the heating plates to perform the massaging of the eyelids. The reciprocating pressure could be generated by a vibration motor, for example, an eccentric rotating mass vibration motor or a linear resonant actuator.

In some other embodiments, the head-worn device roller movement could be in a plurality of directions, including but not limited to the direction along the eyelid margin and the direction perpendicular to the eyelid margin. The variation of the direction where the heated roller is applied to the eyelids may help fully express the inspissated or solidified meibum in the ducts and orifices of meibomian glands.

Figure 12:
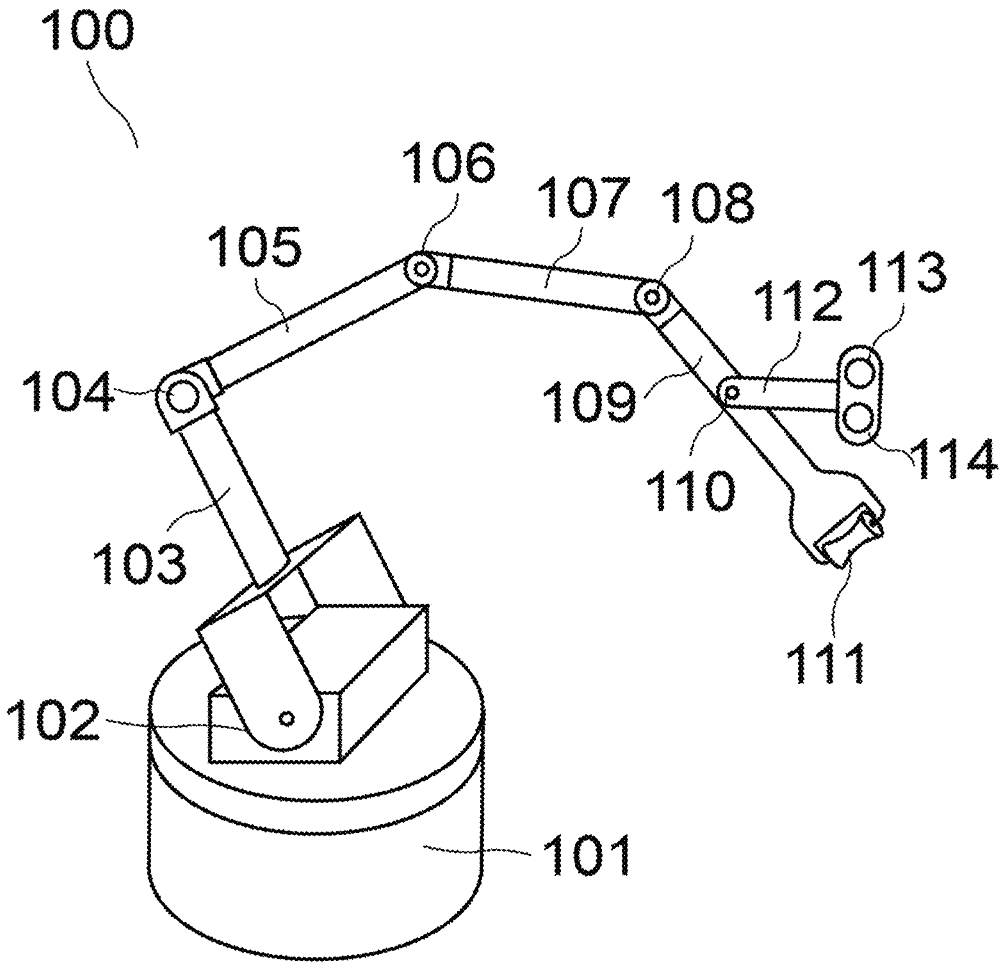
FIG. 12 presents a dry eye treatment device with a robotic arm, including the base, links, joints, and the end effector.

FIG. 12 presents a dry eye treatment device with a robotic arm. The robotic arm 100 comprises a base 101, and a series of links 103, 105, 107, 109, 112. These links are connected by joints 102, 104, 106, 108, 110. The joints allow rotational and/or translational motion. In FIG. 12, the end effector of the robotic arm is the heated roller 111. Further, the link 112 connects to two cameras, one is a visible camera 113 to help the robotic arm to determine the relative position with the eye of the subject so that the robotic arm could place the heated roller precisely and provide massaging of the closed eyelids by the motion of the roller and the control of the pressure applied to the roller. The other camera is a thermal camera 114, which measures the temperatures of the roller and the closed eyelids during use. In some other embodiments, three cameras are employed. Two visible cameras are used for stereoscopic machine vision to precisely locate the robotic arm end effector and the eye of a subject; and an additional thermal camera is for eye temperature monitoring. Preferably, the end effector of the robotic arm 111 is adjustable, so that convex or concave rollers of different sizes could be used.

Figure 13A:
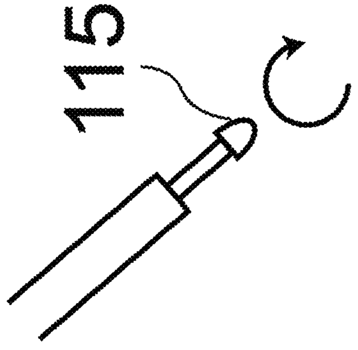
FIG. 13 presents three possible end effectors of the robotic arm.
Figure 13B:
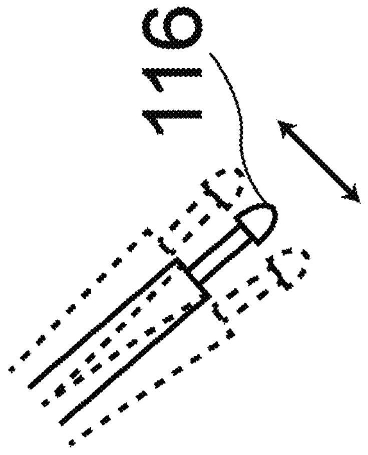
Figure 13C:
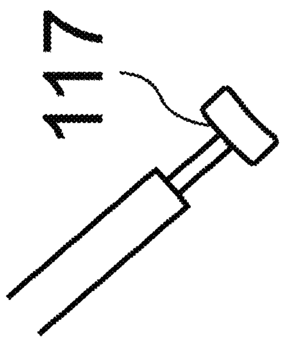

FIG. 13 presents three possible end effectors of the robotic arm. FIG. 13(*a*) presents one embodiment of the end effector, which is a spinning pinhead 115. The spinning pinhead 115 is a small tip, which could be made of metal or other thermally conductive materials such as silicone rubber. The spinning motion is controlled to provide a massaging effect while the heated pinhead is applied to the closed eyelids. FIG. 13(*b*) presents another embodiment of the end effector, where a vibrating pinhead 116 is heated up and vibrates to provide a massaging effect. FIG. 13(*c*) presents yet another embodiment of the end effector, where a heating plate 117 is used. The heating plate 117 is of the shape of eye, conforming to the contour of the closed eyelids. Reciprocating pressure could be applied to the heating plates by the robotic arm to perform the massaging of the eyelids.

The end effector of the robotic arm could also be an intense pulsed light source for intense pulsed light treatment. Further, the end effector could be a laser, and the laser beam could scan across the eyelid and adjacent tissues during a treatment. When a light source is used at the end effector of the robotic arm, it's preferred to use an eye mask to cover at least a portion of an eye, including the entire cornea, such that no light could enter into the eye during the treatment.

Preferably, the subject is lying comfortably on a flat or an inclined bed before the robotic arm is used. The robotic arm is connected to the electric power and a computer (not shown) is used to control its motion based on the feedback from the visible camera (or cameras) 113 and the thermal camera 114, and the motion and pressure sensors (not shown in FIG. 12) embedded inside the robotic arm. Preferably, the robotic arm could provide a heating safety mechanism, so that when the temperature of the roller is above a certain threshold, the roller will be detached from the eyelid to avoid overheating or burning of the eyelid.

Preferably, the robotic arm treats both eyes sequentially for a cycle, and optionally the cycles could be repeated in a number of times. For example, the robotic arm could treat the left eye for 10-15 minutes and then the right eye for another 10-15 minutes. Alternatively, the robotic arm could heat and massage the left eye of a subject for 5 minutes and the right eye of the subject for another 5 minutes and repeat the cycle two or three times.

More preferably, the robotic arm and the associated computer system are trained with machine learning (i.e., robot learning) with a large quantity of images and videos of real-life dry eye treatment by human medical professionals, so that the device could be self-administrated by the subject, yet still could provide professional dry eye treatment, comparable to that in a hospital or an ophthalmic clinic. The machine learning algorithm could be included in the computer software for the robotic arm motion control. Further, with artificial intelligence employed in the robotic arm, human errors could be minimized in the treatment of an eye.

Before a treatment operation with any embodiment of the disclosed device, it's preferred to clean the closed eyelids with a first cleansing wipe, and the first cleansing wipe could contain cleansing chemicals compatible with the eyelid margin, including the skin and the conjunctiva. This first cleansing wipe is used to reduce preexisting debris on the eyelid, especially near the eyelid margin. Alternatively, a cleansing tissue or cloth, a sterilized wipe or other appropriate means could also be used for eyelid cleaning. A roller of a convex cylindrical or concave cylindrical shape is heated to a predetermined temperature or a temperature range before use. Preferably, the warm-up time of the roller is in the order of several seconds to several minutes. Apply thermally conductive gel to the heated roller or spread the thermally conductive gel on the eyelids, so that the thermally conductive gel can fill the space in the contact area of the roller and the eyelid skin, to ensure an effective heat transfer from the heated roller to the tissues in the eyelids. It's preferred to roll the heated roller over an eyelid in a plurality of directions, including but not limited to the direction along the eyelid margin and the direction perpendicular to the eyelid margin. The variation of the direction where the heated roller is applied to the eyelids may help fully express the inspissated or solidified meibum in the ducts and orifices of meibomian glands.

After the heated roller treatment, the thermally conductive gel and the expressed debris could be removed by cleaning with a second cleansing wipe. Alternatively, a cleansing tissue or cloth, a sterilized wipe or other appropriate cleaning means could also be used after the dry eye treatment.

Depending on the underlying etiology and severity of dry eye, the melting point of the meibum could be significantly different for different subjects. In a preferred method, the roller is first heated to a predetermined temperature range of about 40° C. If after the heated roller massaging treatment, the meibomian gland expression is still not significantly improved, the predetermined temperature of the roller surface could be increased by an increment and the disclosed dry eye treatment method could be repeated, as long as the increased temperature is still safe and tolerable for the subject. A typical temperature increment could be 0.5° C., 1° C. or 2° C. The upper limit of the roller surface temperature should be less than 60° C. to avoid eyelid burning or discomfort. For most subjects, extra care has to be taken when the roller surface temperature is above 45° C. to minimize discomfort. Therefore, a small increment (for example, less than 2° C.) in temperature increase is preferred when the roller surface temperature is above 45° C. and may need approval from medical professionals.

In the described embodiments above, when the eyelids are closed, the palpebral conjunctiva is in direct contact with the cornea. However, in some embodiments, a contact lens may be employed, which is thermally insulating, to isolate the effect of the heating to the eyelids and reduce its impact to other parts of the eye, such as the cornea. In other embodiments, a scleral lens with a large-diameter (larger than regular contact lenses) to vault over the entire corneal surface and rest on the sclera (the white of the eye), could be used to protect the cornea and limit the heating and massaging to the eyelids. The tear fluid in the space between the cornea and the back surface of a scleral lens may provide comfort during the dry eye treatment. This may be particularly important for patients with keratoconus and other corneal irregularities.

All publications, patents and patent applications referred to herein are incorporated by reference in their entirety to the same extent as if each individual publication, patent or patent application was specifically and individually indicated to be incorporated by reference in its entirety in the present application.

The invention has been described in detail with particular reference to certain preferred embodiments thereof, but it will be understood that variations and modifications can be effected within the spirit and scope of the invention.

The invention claimed is:

1. A dry eye treatment device, comprising:

a roller, wherein said roller is connected to a holder, wherein said roller is adapted to contact and roll over an eyelid in a plurality of directions in a treatment, wherein said plurality of directions include a direction along a margin of said eyelid and a direction perpendicular to said margin of said eyelid;

a heating element to generate heat, wherein said heating element is outside said roller, wherein at least a portion of said heat is transferred from said heating element to said roller by a heat transfer element with thermal conduction, wherein said heat transfer element passes through a central bore of a shaft of said roller, wherein at least a portion of said heat transfer element is thermally conductive and electrically insulating;

a temperature monitoring system, wherein said temperature monitoring system comprises a thermal sensor and a temperature control circuit;

an electric power source to electrically heat said heating element; and further comprising a thermally insulating element adapted to be placed in between a palpebral conjunctiva and a cornea to limit heating to said eyelid.

2. The device of claim 1, wherein said roller is of a convex cylindrical shape or a concave cylindrical shape.

3. The device of claim 1, wherein said thermal sensor measures a temperature of a surface of said roller or a temperature of an element thermally connected with a surface of said roller, wherein said temperature control circuit ensures said temperature of said surface of said roller is within a predetermined temperature range, wherein said predetermined temperature range is a temperature range within 40 to 60° C.

4. The device of claim 1, further comprising:

a thermally conductive gel to be applied to adapt to said roller and said eyelid in said treatment.

5. The device of claim 1, wherein said roller comprises a thermally conductive coating layer.

6. The device of claim 1, wherein said roller comprises a roller surface having protrusions for massaging.

7. The device of claim 1, wherein said heating element is a resistance heating element outside said roller.

8. The device of claim 1, wherein said heating element is a thermoelectric heating unit outside said roller.

9. The device of claim 1, wherein said heating element is an induction heating unit outside said roller.

10. The device of claim 1, wherein said heat transfer element comprises a contact element, wherein said contact element rubs a surface of said roller when said roller is rolling.

11. The device of claim 1, wherein said roller is motorized and has a speed of rotation of said roller which is adjustable.

12. The device of claim 1, wherein said dry eye treatment device is a head-worn device, wherein said head-worn device comprises a case and a strap to fixate on a head of a subject, wherein said roller is motorized and heated, wherein said roller and said holder are located inside an eye chamber of said head-worn device.

13. A method for dry eye treatment using the dry eye treatment device according to claim 1, comprising:

cleaning the eyelid with a first cleansing wipe;

heating the roller to a predetermined temperature;

applying thermally conductive gel between said roller and said eyelid;

rolling said roller over said eyelid in a plurality of directions; and removing said thermally conductive gel and expressed debris with a second cleansing wipe.

14. The method of claim 13, further comprising increasing said predetermined temperature by an increment, and repeating said method for dry eye treatment.

15. The device of claim 1, wherein said thermally insulating element is a contact lens.

16. The device of claim 1, wherein said thermally insulating element is a scleral lens.

17. A dry eye treatment device, comprising:

a roller, wherein said roller is connected to a holder, wherein said roller is adapted to contact and roll over an eyelid in a plurality of directions in a treatment, wherein said plurality of directions include a direction along a margin of said eyelid and a direction perpendicular to said margin of said eyelid;

a heating element to generate heat, wherein said heating element is inside said roller, wherein at least a portion of said heat is transferred from said heating element to said roller, wherein at least a portion of said heating element is thermally conductive and electrically insulating;

a temperature monitoring system, wherein said temperature monitoring system is outside said roller, wherein said temperature monitoring system comprises a thermal sensor and a temperature control circuit;

an electric power source to electrically heat said heating element.; and further comprising a thermally insulating element adapted to be placed in between a palpebral conjunctiva and a cornea to limit heating to said eyelid.

18. The device of claim 17, wherein said heating element is a roller surface of said roller heated by eddy currents of induction heating.

19. A dry eye treatment device, comprising:

a robotic arm, wherein said robotic arm comprises an end effector, wherein said end effector is a member selected from the group consisting of a spinning pinhead, a vibrating pinhead, and a heating plate, wherein said end effector moves in a plurality of directions to adapt to an eyelid in a treatment, wherein said plurality of directions include a direction along a margin of said eyelid and a direction perpendicular to said margin of said eyelid;

a computer to control a motion of said robotic arm;

a heating element to generate heat, wherein said heating element is outside said end effector, wherein at least a portion of said heat is transferred from said heating element to said end effector by a heat transfer element with thermal conduction, wherein at least a portion of said heat transfer element is thermally conductive and electrically insulating;

a temperature monitoring system, wherein said temperature monitoring system comprises a thermal sensor and a temperature control circuit;

an electric power source to electrically heat said heating element.; and further comprising a thermally insulating element adapted to be placed in between a palpebral conjunctiva and a cornea to limit heating to said eyelid.

20. The device of claim 19, wherein said robotic arm and said computer are trained with machine learning.

* * * * *